INVENTOR.
FRANK KESSLER

BY

ATTORNEY

Patented Oct. 25, 1949

2,486,172

UNITED STATES PATENT OFFICE 2,486,172

IMPULSE TESTING APPARATUS

Frank Kessler, Lombard, Ill., assignor to Automatic Electric Laboratories, Inc., Chicago, Ill., a corporation of Delaware Application January 8, 1945, Serial No. 571,783

9 Claims. (Cl. 179—175.2B)

The present invention relates in general to apparatus for testing the operation of an impulsing contact and in particular to apparatus for remotely testing the operation of an impulse transmitter located at a subscriber substation of an automatic telephone system.

The operation of the switching equipment of an automatic telephone exchange depends upon both the speed and the impulse ratio of the impulses it receives from the transmitter at a subscriber substation. Heretofore, automatic testing apparatus has been provided to test the speed of operation of the impulse transmitter without the intervention of an operator but the assistance of a test operator at the exchange has been required to perform an impulse ratio test. In the copending application of Frank Kessler et al.; Serial No. 571,782 filed Jan. 8, 1945, now Patent No. 2,416,102, granted Feb. 18, 1947; an impulse testing apparatus operative under the control of the impulse transmitter at a subscriber substation to simultaneously perform an impulse ratio and a speed test on impulses received therefrom is disclosed. Various modifications in the testing apparatus disclosed in said copending application which are directed to improving the accuracy of the tests performed by the apparatus are disclosed in the copending application of Roger Ghormley; Serial No. 571,781, filed Jan. 8, 1945, now Patent No. 2,428,488, granted Oct. 7, 1947. The present invention concerns a further modification of the apparatus disclosed in said copending applications which provides means for measuring the impulse ratio of an impulse transmitter located at a subscriber substation independently of the characteristics of the substation line.

The principal object of the present invention is to provide an automatic testing means operative under the control of the impulse transmitter at a subscriber substation to perform an impulse ratio test on impulses received therefrom independently of the substation line characteristics.

A further object of the invention is to provide an impulse testing apparatus which is operative under the control of the impulse transmitter at a subscriber substation to perform an impulse ratio test on either the transmitter or on the contacts of a line relay controlled by the transmitter.

Still another object of the invention is to provide an impulse testing apparatus in accordance with the preceding object which is arranged to utilize the apparatus employed in the impulse ratio test on the transmitter for performing an impulse speed test thereon.

Figure 1:
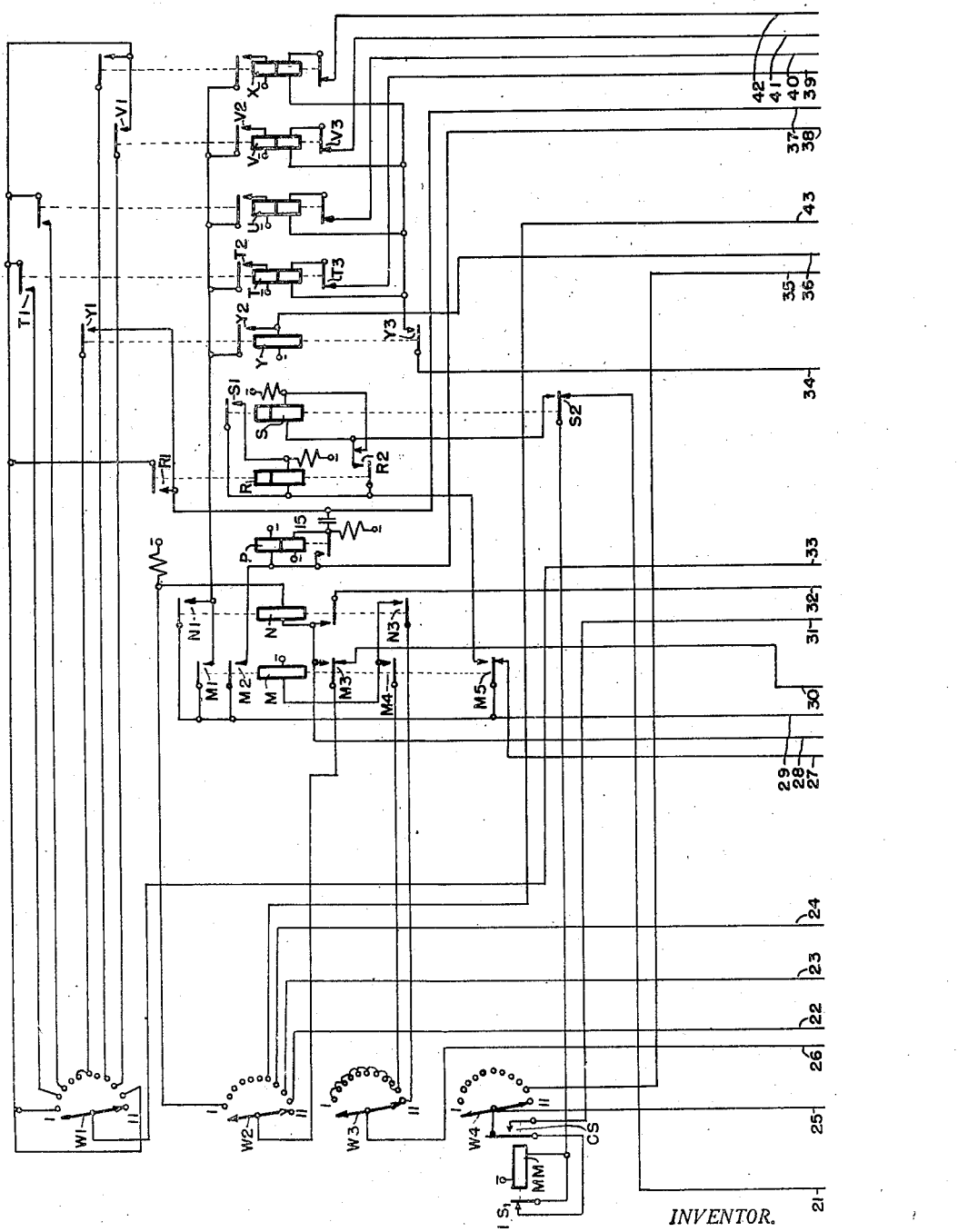
Figure 2:
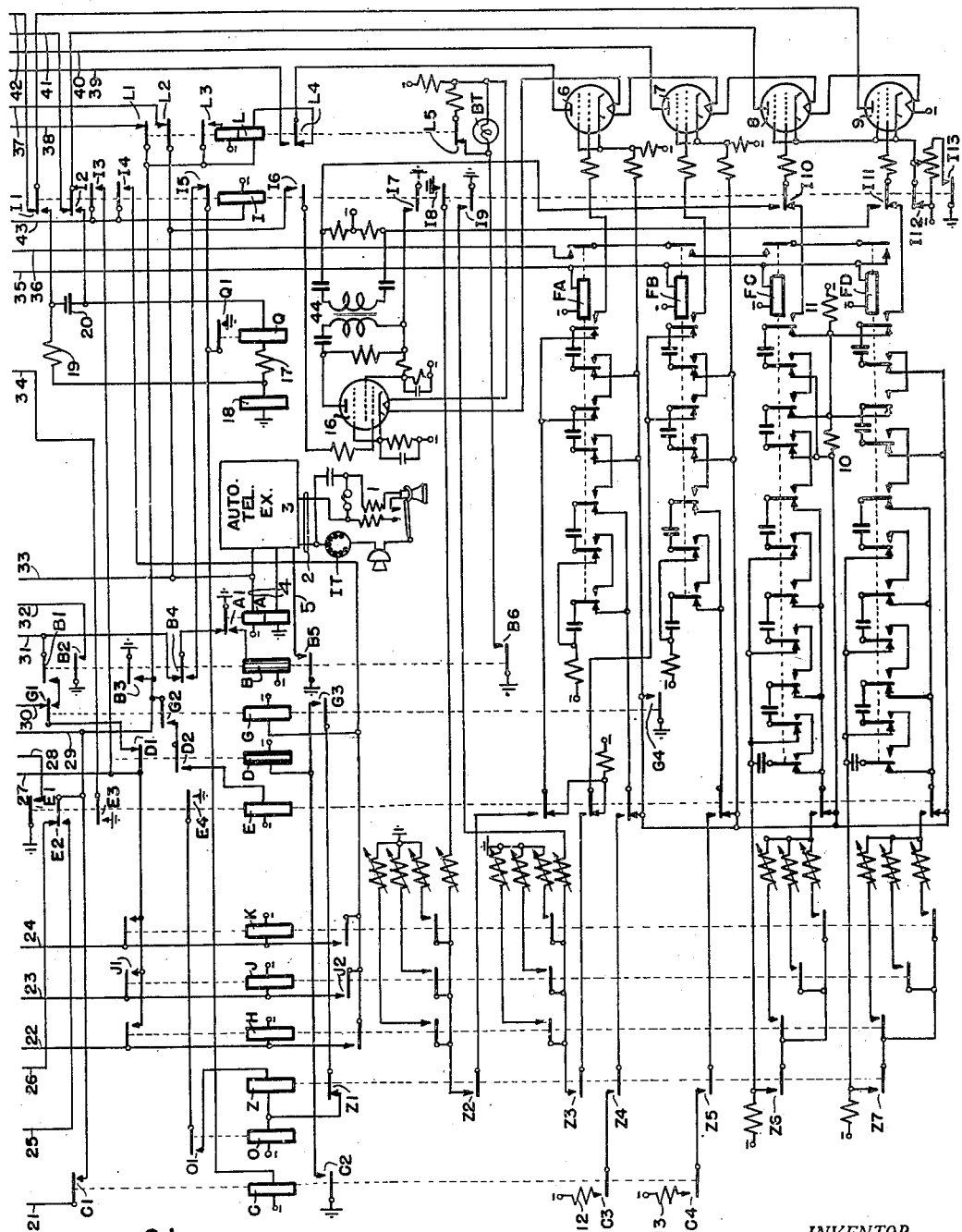

Other objects of the invention will appear upon a further perusal of the specification taken in connection with the accompanying drawings comprising Figs. 1 and 2, which taken together form a complete schematic diagram of the testing apparatus.

It is contemplated that the testing apparatus may be made an integral part of a conventional telephone exchange or that it may be made as a separate portable unit which may be connected to the exchange switching equipment as required. To this end the apparatus is made as complete in itself as possible. The only connections which need be made to the regular exchange equipment are two connections to the exchange battery and three connections to the bank contacts of a selector through which the testing unit may be reached by the exchange switching equipment. The three connections to the selector include two line leads over which the subscriber loop is extended and the private, or holding lead, over which the switch train is held under the control of the subscriber loop circuit. The line leads terminate in an impulsing relay which is preferably of the same type and has the same impulsing characteristics as the corresponding line relays in the switching equipment. Contacts of this impulsing relay are arranged to control a group of relays and a rotary switch to perform the desired tests in response to operation of the impulsing relay by the transmitter at a subscriber substation. The first series of operations of the impulsing relay causes the apparatus to select the desired limits between which the test is to be made. A succeeding series of a predetermined number of operations of the impulsing relay causes simultaneous tests to be made which determine whether the speed and impulse ratio are within the selected limits. The apparatus then returns a coded tone signal to the subscriber substation indicative of the results of the test and also indicative of whether the required predetermined number of impulses were received. The actual measurement of the speed and impulse ratio is performed by a series of condenser-resistor networks and associated gaseous discharge tubes. The speed measurement is accomplished by causing two groups of initially charged condensers to be partially discharged during the time that the predetermined number of operations of the impulsing relay takes place. The charge which remains on these condensers is then an indication of the total duration of the series of impulses. The remaining charge is measured by two gaseous discharge tubes and relays controlled by these tubes are operated in accordance with whether the remaining charge is within the previously selected limits. To increase the accuracy of the time measurement each group of condensers consists of four condensers which are discharged in multiple and then connected in series adding to the gaseous discharge tube control electrodes. The impulse ratio measurement is accomplished by a further group of initially charged condensers. Each of these further groups is divided into two sub-groups. One sub-group of each further group is partially discharged during the break periods of the received impulses while the other sub-groups of each further group are partially discharged during the time that the predetermined number of operations of the impulsing relay takes place. By the proper choice of circuit constants the charges on the two sub-groups of condensers of each further group can be made equal for a desired impulse ratio independently of the impulse speed. The difference between the charges on the sub-group condensers is measured by a pair of gaseous discharge tubes and relays controlled by these tubes are operated in accordance with whether the difference is positive or negative. The relays controlled by the gaseous discharge tubes prepare marking circuits to the banks of the rotary switch from a tone generator. The rotary switch is then operated to successively connect the subscriber line to the several marking circuits and thereby causes a coded tone signal to be returned to the subscriber substation indicative of the results of the speed and impulse ratio test.

In order to permit the impulse ratio of the transmitter at the subscriber substation to be measured independently of the line characteristics arrangements are provided whereby the first operation of the impulse transmitter may cause a repeater, which is operative to accurately repeat impulses corresponding to those produced by the impulse transmitter, to be interposed between the substation line and the impulse ratio testing circuit. The repeater comprises a vacuum tube amplifier which is coupled in push-pull relation to a pair of gaseous discharge tubes. To save equipment, arrangements are made for using in the impulse repeater the pair of gaseous discharge tubes which are normally used in the speed test. When the input of the vacuum tube amplifier is coupled to the substation line, the gaseous discharge tubes are fired alternately at the instants of make and break of the contacts of the impulse transmitter. A relay controlled by one of these tubes repeats the impulses to the impulse ratio testing circuit which operates as described above to test the ratio of the repeated impulses.

Referring now to the drawings, a subscriber substation 1 is shown connected via line 2 to an automatic telephone exchange 3. By dialing an appropriate number over line 2 from the subscriber substation, line 2 may be extended by means of the exchange switching equipment to line 4. The usual impulse transmitter IT forming a part of the subscriber telephone may be employed for this purpose or, if it is so far out of adjustment as to preclude proper operation of the exchange switching equipment, a separate impulse transmitter such as is usually carried by telephone maintenance men may be used. When the subscriber loop is extended to line 4 a circuit is completed to relay A which operates and closes a circuit to relay B. Relay B operates, at contacts B5 grounds lead 5 to hold the switching equipment in the exchange through which the subscriber loop is extended, at contacts B3 connects ground or plus battery to the anode of tube 6 through the lower winding of relay L, and at contacts B6 closes a circuit to the series connected heaters of tubes 6, 7, 8, 9, and 16. A ballast tube BT is connected in series with the tube heaters to prevent changes in exchange battery voltage from affecting the heater current. During the warm up period this ballast tube is shunted by a resistor through contacts L5. The operation of relay B also completed a circuit from contacts B3, through contacts L1, and over lead 38 to the upper winding of relay P. Relay P is arranged to complete a circuit to its lower winding when it operates. Its two windings are connected differentially which causes it to vibrate its armature at a rapid rate and thus produce an audio frequency voltage across its lower winding. This alternating tone voltage is conveyed through condenser 15, over lead 37, and through contacts L2 to line 4 which is connected via the exchange switch train to the subscriber line 2. When the cathodes of the tubes have been heated sufficiently, tube 6 strikes and energizes the lower winding of relay L. Relay L operates, disconnects the line 4 from the tone source at contacts L2 to inform the test man that the equipment is ready for use, opens the circuit to the tone generating relay P at contacts L1, closes a locking circuit to its upper winding at contacts L3, transfers the anode of tube 6 from the lower winding of relay L to lead 39 at contacts L4, and removes the resistance shunt from ballast tube BT at contacts L5. Tube 6 deionizes as there is no potential on lead 39 at this time.

The testing unit is now prepared for use. The test man at the subscriber station is informed of this fact by the cessation of the tone and he therefore proceeds to dial an appropriate digit to select the limits between which he desires to test the impulsing device at the subscriber station. In the present instance three sets of limits have been provided, any one of which may be selected by dialing "8," "9," or "0." Assuming that the test man dials a "9," relay A will be momentarily released nine times in succession. Each time that relay A restores it completes a circuit at contacts A1 and through contacts B4 and I5 to relay C which is thus momentarily operated nine times in succession. Each time that relay C operates it closes a circuit to the motor magnet MM of the rotary switch from ground at contacts B3, through contacts C1, over lead 21, and through contacts S2 to MM. Motor magnet MM advances the rotary switch wipers one step each time that it restores. A circuit is also completed to relay D by contacts C2 while relay C is operated. Relay D is rendered slow to release by a copper sleeve on its core and thus remains operated during the series of impulses. Relay B is similarly made slow to release so that it remains operated even though its circuit is interrupted by relay A during dialing. At the conclusion of the series of impulses the wipers W1 to W4 of the rotary switch will be resting on the ninth set of bank contacts. Relay D restores shortly after the series of impulses is completed and closes a circuit to relay J from ground at contacts B3, over lead 29, through contacts M5, over lead 27, through contacts D1 and G1, over lead 30, through contacts M3 and the ninth bank contact of wiper W2, and over lead 23 to relay J. Relay J operates, closes its locking circuit at contacts J1 to ground on lead 27, and closes a circuit in multiple with itself to relay G at contacts J2. Relay G operates and at contacts G1 opens the operating circuit to relay J and closes a homing circuit to the rotary switch motor magnet from ground on lead 27, through contacts D1, G1 and B1, over lead 31, and through cam springs CS and interrupter springs IS to MM. The motor magnet operates self-interrupting to drive the wipers to the eleventh step where the cam springs CS open to stop further rotation of the wipers. The operation of relay G also completes a charging circuit to all of the condensers connected to contacts of relays FA to FD at contacts G4. The condensers in the first and second horizontal rows are each charged to the exchange battery voltage. In the third and fourth horizontal rows the first four condensers from the left of each row are also each charged to the exchange battery voltage while the remaining two condensers at the right of each row are each charged to a predetermined fraction of the exchange battery voltage. The fractional voltage to which the latter four condensers are charged is determined by the relative magnitudes of resistors 10 and 11.

The test man now dials a "0" causing relay A to operate relay C ten times in succession. Relay D again operates the first time that relay C operates and remains operated throughout the series of impulses. The operation of relay C also completes a circuit to relay O through contacts C2, G3, and Z1. The operation of relay D opens the homing circuit to the rotary switch at contacts D1 and closes a circuit to relay E at contacts D2 through contacts G2 to ground at contacts B3. Relay E operates; at contacts E1 closes a circuit to relay N over lead 28, at contacts E2 extends ground from contacts B3 to wiper W4 over lead 25, at contacts E4 closes a circuit to relays O and Z in series through contacts O1, and at its lower six sets of contacts opens the charging circuits to all of the condensers in Fig. 2 excepting the first two condensers from the right in the third and fourth rows. Relay N operates and locks over lead 32 to ground at contacts B2.

Relay Z is short circuited during the first operation of relay C but when relay C restores the first time this short circuit is removed at contacts C2. Relay Z operates in series with relay O, opens its shunting circuit at contacts Z1, at contacts Z2 and Z3 closes discharge paths through the pair of resistors previously selected by the operation of relay J to the two condensers on the right of each of the first and second rows, at contacts Z4 and Z5 prepares discharge paths to the two condensers on the left of each of first and second rows, and at contacts Z6 and Z7 closes discharge paths through the second pair of resistors previously selected by the operation of relay J to the four condensers on the left of each of the third and fourth rows. During the succeeding nine operations of relay C the discharge paths prepared by contacts Z4 and Z5 are intermittently completed by contacts C3 and C4 through resistors 12 and 13, respectively. The motor magnet MM is operated intermittently by contacts C1 over the previously traced circuit causing the rotary switch wipers to advance one step at the end of each impulse. When relay C restores for the tenth time wiper W4 is advanced to its tenth bank contact thus completing a circuit to relays FA, FB, FC and FD in multiple over lead 35. Relays FA through FD operate, transfer all of the condensers to the control electrodes of their associated tubes in series connected groups, and close a circuit in multiple with themselves over lead 36 to relay Y. Relay Y operates, closes its locking circuit at contacts Y2 through contacts N1 and over lead 29 to ground at contacts B3, and connects plus battery from contacts E3 over lead 34 and through contacts Y3 and the lower windings of relays T, U, V, and X to the anodes of tubes 6, 7, 8, and 9, respectively, over leads 39, 40, 41, and 42.

First considering only the first horizontal row of condensers associated with tube 6, during the testing interval the two condensers on the left are discharged during the break periods of nine of the ten impulses received and during the same period the two condensers on the right are discharged continuously. Let $V_0$ be the initial voltage to which all of these condensers were initially charged, $R_1$ be the resistance through which the left two condensers are intermittently discharged, $C_1$ be the capacity of each of these condensers, $r$ be the ratio between the break periods to the total period of each of the received impulses, $R_2$ be the resistance through which the right two condensers are continuously discharged, $C_2$ be the capacity of each of these condensers, and $t$ be the total time required for the nine impulses during which the condensers are discharged. Then the final voltage $V_1$ across the left condensers will be $$V_1 = V_0 \epsilon^{-\frac{rt}{2R_1 C_1}}$$

where $\epsilon = 2.71828$ and the final voltage $V_2$ across the right two condensers will be $$V_2 = V_0 \epsilon^{-\frac{t}{2R_2 C_2}}$$

From these two equations it is seen that $V_1$ will be equal to $V_2$ when $$\frac{R_1 C_1}{R_2 C_2} = r$$

regardless of the value of the initial voltage $V_0$ to which the condensers were initially charged or of the total time $t$ during which the discharge takes place. When relay FA operates it connects the four condensers in series to the control electrode of tube 6 so that the voltage between the control electrode and cathode is equal to $$2(V_2 - V_1)$$

plus a fixed bias potential. The fixed bias potential is derived from a voltage divider connected from ground at contacts G4 to negative battery and having a tap connected to the cathode and shield grid of tube 6. The value of this bias potential is made equal to the striking potential of the tube so that when $V_1$ is greater than $V_2$ the tube will fire and when $V_1$ is less than $V_2$ the tube will not fire. Thus for given values of $R_1 C_1$ and $R_2 C_2$ tube 6 will fire if the impulse ratio $r$ is below a particular value and tube 6 will not fire if the impulse ratio is above this particular value. It should be noted that since the voltages $V_1$ and $V_2$ are equal for a particular impulse ratio regardless of the value of the time $t$ during which the discharge takes place, the ratio test is independent of the impulse speed. Furthermore, the voltages $V_1$ and $V_2$ are equal for a particular impulse ratio $r$ regardless of the value of the initial voltages $V_0$ to which the condensers were initially charged, thus by operating tube 6 over the range where its grid striking potential is a linear function of its anode voltage the effects of variation in exchange voltage are eliminated since the bias voltage and plate voltage are derived from the same source and vary in the same proportions. It should be apparent that if $n$ condensers were discharged in multiple in each of the two paths and then connected in series that the net grid voltage would be $n(V_2-V_1)$ thus permitting still greater sensitivity without any increase in the voltage to which the condensers are initially charged.

The second horizontal row of condensers and the associated tube 7 operate in precisely the same manner as described in the preceding paragraph except that a different ratio of $$\frac{R_1 C_1}{R_2 C_2}$$

is used so that whether tube 7 fires or not is determined by whether the impulse ratio $r$ is below or above a different particular value. Thus if the impulse ratio is below both particular values both tubes will fire, if the impulse ratio is between the two values only one tube will fire, and if the impulse ratio is above both values neither tube will fire. In the present instance tube 6 is the one that normally fires.

Referring now to the third horizontal row of condensers and the associated tube 8, the four condensers on the left are continuously discharged in multiple during the time that nine of the ten impulses are received but the two condensers on the right are not discharged. When relay FC operates these six condensers are connected in series between the control electrode and cathode of tube 8. The two right condensers are connected in opposition to the four left condensers. The time constant RC of the discharge path of the four left condensers is preferably made equal to the duration of nine impulses at a desired particular speed. The potential to which each of the right two condensers are charged is then made equal to twice the final voltage of each of the four left condensers in a time equal to the time constant RC. Thus the net voltage across the six condensers in series will be zero if the duration of the nine received impulses is equal to RC. If a bias potential was used in the grid circuit of tube 8 as for tubes 6 and 7 the tube 8 would just strike when the voltage across the six condensers was zero. In this case it is not necessary to employ a bias potential since the voltage to which the two right condensers are charged can be increased slightly to provide a net voltage, when connected in series with the four right condensers, equal to the striking voltage of tube 8. This difference voltage will be a linear function of the exchange voltage and will therefore vary in direct proportion to the anode voltage of the tube when the exchange battery voltage varies thus eliminating any variations due to changes in exchange battery voltage. This method of operation could not be used in the impulse ratio test because if the bias voltage was eliminated and instead voltages $V_1$ and $V_2$ were allowed to be unequal at the particular impulse ratio at which the tubes 6 or 7 were to fire, then the difference between $V_1$ and $V_2$ would be a function of both the exchange voltage and duration of the discharge time. Variations due to changes in exchange voltage would still be eliminated but the ratio test would not be independent of the impulse speed. The use of the two right condensers in the speed test permits comparison of the final voltage of the four left condensers with a voltage equal to a predetermined fraction or multiple of the exchange battery voltage and yet permits the exchange battery to be used as the anode voltage supply for the tube 8. If the difference between four times the final voltage of each of the four left condensers and twice the voltage of each of the two right condensers is above the grid striking potential of tube 8 it will fire, while if this difference is below the grid striking potential it will not fire. Thus if the impulse speed is faster than a particular value tube 8 will fire and if the speed is slower than the particular value tube 8 will not fire.

The fourth horizontal row of condensers and associated tube 9 operate in precisely the same manner as described in the preceding paragraph except that a different time constant is used so that tube 9 will fire if the impulse speed is faster than a different particular value and will not fire if the impulse speed is slower than the different particular value. Thus if the speed of the received impulses is faster than either of two predetermined values both tubes will fire, if the speed is between the two values only one tube will fire, and if the speed is slower than either value neither tube will fire. In the present instance it will be assumed that tube 8 is the one that normally fires.

Assuming that the impulse ratio and speed of of the received impulses were within the previously selected limits, tubes 6 and 8 fire and their anode currents flowing over leads 39 and 41 energize the lower windings of relays T and V. Relays T and V operate, prepare marking circuits to the bank contacts of wiper W1 at contacts T1 and V1, close locking circuits to their upper windings at contacts T2 and V2, and open the anode circuits to tubes 6 and 8 at contacts T3 and V3. Tubes 6 and 8 deionize. This completes the registration of the results of the test, the next step being the return of a coded tone signal to the test man indicative of the results of the test.

Relay D restores shortly after the series of ten impulses is completed and at contacts D1 closes the homing circuit for the rotary switch which was previously traced, and opens the circuit to relay E at contacts D2. Relay E restores and opens the series circuit to relays O and Z which restore. The motor magnet MM advances the rotary switch wipers to the eleventh step where a circuit is completed from ground at contacts B3, through contacts E2, over lead 26, through the eleventh bank contact of wiper 11 and contacts N3 to relay M. Relay M operates; opens the homing circuit to the rotary switch, opens the locking circuits to relays J and G, and closes a circuit to relay R at contacts M5; prepares its locking circuit at contacts M4, closes a circuit to the tone generating relay P at contacts M2; and closes a multiple circuit to contacts N1 at contacts M1. Relays J and G restore. Relay P begins to generate a tone voltage. Relay R operates and closes a circuit to relay S at contacts R2. Relay S operates, short-circuits relay R at contacts S1, and closes a circuit to motor magnet MM at contacts S2 in multiple with itself. Motor magnet MM operates. Relay R restores, opens the circuits to relay S and MM and short-circuits relay S at contacts R2. Motor magnet MM restores and advances the rotary switch wipers to the first set of bank contacts. Wiper W3 opens the operating circuit and closes the lock circuit to relay M through contacts M4. Relays R and S continue to pulse. These two relays are made slow to operate and to release by means of copper slugs on the armature ends of their cores to regulate the speed at which they operate. During a portion of the time that the wiper W3 rests on bank contact 1, a circuit is completed from the lower winding of relay P, through condenser 15, contacts R1, wiper W1, over lead 33 to line 4, and thence to the subscriber line 2 over the exchange switch train; thus returning a splash of tone to the subscriber telephone. Each time that relay S operates a circuit is completed to the motor magnet MM causing it to operate, and each time that relay R restores it opens the circuit to the motor magnet MM causing it to restore and advance the wipers one step. While the wipers are resting on the second step another splash of tone is returned to the subscriber telephone, during the interval when relay R is operated, over a circuit similar to that previously traced except that it now includes contacts T1. Relay N is short-circuited through wiper W2 and contacts M3 causing it to restore. A long splash of tone is returned when the wiper W1 rest on bank contacts 5 and 6 because these contacts are multipled and the tone circuit is not interrupted by relay R. This circuit is taken through contacts Y1 so that the presence of the long splash of tone serves to verify to the test man that the digit "0" was correctly received by the testing apparatus. Two more short splashes of tone are returned when the wipers rest on the ninth and tenth bank contacts. The first circuit includes contacts V1 and R1 and the second includes only R1. Thus the tone signal received by the test man consists of two short splashes of tone followed by a long tone signal and then two more short splashes of tone. When the rotary switch is advanced to the eleventh step the locking circuit to relay M is opened by wiper W3. Relay M restores, at contacts M1 opens the locking circuits to relays FA, FB, FC, FD, Y, T, and V causing them to restore, opens the circuit to the tone generating relay P at contacts M2, and opens the circuit to the interrupter relays R and S at contacts M5. All relays are now restored to normal except relays A, B, and L which remain operated until the subscriber loop circuit is opened by the restoration of the receiver on the hookswitch of the telephone at the subscriber station. Since the equipment is now in exactly the same condition as it was prior to the test, it should be apparent that the test may be repeated by re-operating the impulse transmitter at the subscriber substation. If desired, the digits "8" and "0," or "0" and "0," may be dialed the second time in place of "9" and "0" in order to change the limits between which the tests are made. If no further tests are required the test man restores the receiver on the hookswitch causing the subscriber loop circuit to be opened. When the subcriber loop circuit is opened relay A restores and opens the circuit to relay B which restores and removes ground from the holding lead 5 at contacts B5 and opens the locking circuit to relay L at contacts B3. Relay L restores.

In the event that the impulse ratio $r$ of the received impulses was too low, or conversely the ratio $(1-r)$ of the closed to the total periods of the received impulses was too high, both tubes 6 and 7 would have fired causing the operation of both relays T and U. Bank contacts 1, 2, and 3 of wiper W1 would then be connected to the tone source through contacts R1 causing three short splashes of tone to be returned to the test man before the long tone signal. If the impulse ratio $r$ was too high, or conversely the ratio $(1-r)$ of the closed to the total periods of the received impulses was too low, neither tubes 6 nor 7 would have fired and consequently neither relay T nor U would have been operated. Thus only one short splash of tone would be sent before the long tone signal. In a similar manner, if the dial speed was too fast both tubes 8 and 9 would fire causing both relays V and X to operate, or if the dial speed was too slow neither tubes 8 nor 9 would fire causing both relays V and X to remain normal. Thus three splashes of tone following the long tone signal, indicating a fast dial; or one splash of tone following the long tone signal, indicating a slow dial; would be returned to the test man.

It is oftentimes desirable to have different adjustment margins for different dials depending upon the type of line with which they are used. Thus a wide margin may be permissible for a local subscriber dial, an intermediate margin may be required for dials which are used with short trunks or heavily loaded party lines, while a narrow margin may be necessary for dials which are used with inter-office trunks. Provision for testing with any one of three margins is provided by arranging the testing apparatus so that any one of the three relays H, J, or K may be operated when the test man dials the first digit after seizing the testing equipment. In the previous discussion it was assumed that a "9" was dialed which caused the operation of relay J. It should be apparent from the preceding description that if the first digit had been "8" or "0" instead of "9," either relay K or H would have been operated in place of relay J. The operations are identical to those previously described except that slightly different valued resistors are connected in the four condenser discharge paths. All of these resistors are adjustable so that the impulse ratio and speed limits for any of the three sets of margins can be varied as desired. These resistors may be initially adjusted by operating relay A with impulses of known characteristics, as from a varying machine, and adjusting the various resistors until the desired results are obtained.

In the preceding tests the impulse ratio that is measured is that of the contacts of relay C, which is the same as that of the contacts of relay A. Since it is the impulse ratio of the contacts of relay A, or its equivalent, that determine whether the automatic stepping switches in the exchange will operate satisfactorily, the principal object of the impulse ratio test is to determine whether the impulse ratio of the line relay contacts are within the required limits.

This ratio may be outside of the required limits for several reasons. For example, the impulse transmitter may not be properly adjusted, the substation line may be abnormally long causing it to have an unusually high series resistance or unusually low shunt resistance, or there may be a fault on the line such as a resistance ground. In some cases it may be desirable to adjust the impulse ratio of the impulse transmitter to a value somewhat higher or lower than the nominal value in order to compensate for unusual line conditions, provided that such adjustment is not carried so far as to attempt to compensate for line faults. In order to permit such adjustment to be performed intelligently, it is desirable that the test man should be able to ascertain whether the impulse ratio of the transmitter is within predetermined limits. This is accomplished in the present testing apparatus by prefixing a "7" to the usual test digit "0." It should be apparent from the preceding description that when the first digit dialed after seizing the testing apparatus is a "7" in place of "8," "9," or "0," that relay I will be operated from ground at contacts B3, over lead 29, through contacts M5, over lead 27, through contacts D1 and G1, over lead 30, through contacts M3 and the seventh bank contact of wiper W2, and over lead 43 to relay I. Relay I operates, transfers the anode of tube 9 from lead 42 to ground through resistor 19 and impedance 18 at contacts I1, transfers the anode of tube 8 from lead 41 to ground through relay Q, resistor 17, and impedance 18 at contacts I2, closes its locking circuit to lead 27 at contacts I3, closes a circuit to relay G in multiple with itself at contacts I4, opens a further point in the circuit to relay C at contacts I5, connects the control grid of vacuum tube 16 to the top winding of relay A in series with a high resistance at contacts I6, connects ground to the anode and screen grid of vacuum tube 16 at contacts I7, prepares discharge paths for the two right condensers of each of the first and second rows at contacts I8 and I9, transfers the control electrodes of gaseous discharge tubes 8 and 9 from their normal circuits to the secondary winding of the transformer connected in the anode circuit of tube 16 at contacts I10 and I11, and applies a bias voltage to the cathodes and screen electrodes of tubes 8 and 9 at contacts I12 and I13. When the anode circuit of tube 16 is energized by the closing of contacts I7 a voltage drop is produced across the anode load resistor which causes an impulse of current to flow in the primary winding of the transformer 44. A voltage impulse having an instantaneous magnitude proportional to the rate of change in current in the primary winding is induced in the secondary winding of transformer 44. This induced voltage causes a displacement current to flow through the condensers and resistors which are connected in series across the transformer secondary winding. The current flowing through these latter resistors increases the voltage between the control eelctrode and cathode of tube 8 and reduces the voltage between the control electrode and cathode of tube 9. Tube 9 consequently fires but without effect. Relay G operates, at contacts G1 opens the operating circuit to relay I and closes a homing circuit to the rotary switch motor magnet from ground on lead 27, through contacts D1, G1 and B1, over lead 31, and through cam springs CS and interrupter springs IS to MM. The motor magnet operates self-interrupting to drive the wipers to the eleventh step where the cam springs CS open to stop further rotation of the wipers. The operation of relay G also completes the charging circuits to all of the condensers connected to contacts of relays FA to FD.

The test man now dials a "0" causing relay A to be operated intermittently without effect. Each time that the circuit to relay A is opened by the impulse transmitter IT the current flowing through relay A starts to fall. Due to the presence of the condenser connected across line 2 in series with the ringer, the current will fall exponentially. Since relay A acts as an inductance a voltage is induced in its winding which tends to oppose any change in the current flowing through it. As a result of this voltage of self-induction the control grid of vacuum tube 16 is made negative with respect to the negative battery terminal causing a sharp reduction in the anode current of the tube. The change in anode current of tube 16 causes a voltage impulse to be induced in the secondary winding of transformer 44 in such a direction as to cause gaseous discharge tube 8 to fire and operate relay Q. Due to the capacitative coupling between the anodes of tubes 8 and 9 through condenser 20, tube 9 becomes deionized in response to the firing of tube 8. Relay Q operates and closes a circuit to relay C at contacts $Q_1$. Each time that the circuit to relay A is closed by the impulse transmitter IT, the control grid of vacuum tube 16 is made positive with respect to the negative battery terminal causing a sharp increase in the anode current of tube 16. The high resistance in series with the control grid of tube 16 prevents excessive grid current from flowing in the event that the voltage drop across the top winding of relay A is high enough to make the grid positive with respect to the cathode. The sharp increase in anode current of tube 16 causes a voltage to be induced in the secondary winding of transformer 44 in such a direction as to cause gaseous discharge tube 9 to fire. Tube 8 is extinguished in response to the firing of tube 9 because of the capacitive coupling between the anodes of the tubes and thus causes relay Q to release and open the circuit to relay C at contacts $Q_1$. The remaining operations which occur as a result of the intermittent operation of relay C are the same as previously described except that no speed test is made and the two right condensers in each of the first and second rows are discharged through contacts Z2 and Z3 and the resistors connected to contacts I8 and I9 of relay I in place of being discharged through the resistor connected to contacts of relays H, J, or K. Relay I is released upon the operation of relay M during the ensuing operations. A coded tone signal is returned to the subscriber substation in the same manner as when relay C is operated by relay A, the only difference being that different limits may be used and the tones returned indicate whether the impulse ratio of IT, rather than the impulse ratio of the contacts of relay A, lies between the desired limits. Since the impulse repeater comprising tubes 16, 8, and 9, is controlled by the changes in line current which occur at the instants of make and break of the line circuit, rather than by the magnitude of the line current, relay Q repeats impulses to relay C which have the same impulse ratio as that of the transmitter IT regardless of the line characteristics.

It should be understood that numerous modifications in the details of the circuit arrangements may be resorted to without departing from the true spirit and scope of the invention as defined in the subjoined claims.

What is claimed is:

1. In a testing apparatus, a circuit including a source of impulses, a pair of gaseous discharge tubes each having an anode, a cathode, and a control electrode, means coupling the control electrodes of said tubes to said circuit so as to cause one tube to fire at the beginning of an impulse and the other tube to fire at the end of an impulse, means causing either tube to be extinguished in response to the firing of the other tube, means controlled by the anode currents of said tubes for determining the ratio of the length of each impulse to the interval between it and a succeeding impulse, and means controlled by said determining means for indicating said ratio.

2. In a testing apparatus, a circuit including an interrupting device, a pair of gaseous discharge tubes each having an anode, a cathode, and a control electrode, means coupling the control electrodes of said tubes to said circuit in push-pull relation so as to cause the tubes to be fired alternately in response to operation of the interrupting device, means causing either of said tubes to be extinguished in response to the firing of the other tube, means controlled by the anode currents of said tubes for determining the impulse ratio of the length of the make period to the length of the break period of the interrupting device, and means controlled by said determining means for indicating the ratio determined.

3. In a testing apparatus, a circuit including a source of impulses, a pair of gaseous discharge tubes each having an anode, a cathode, and a control electrode, means coupling the control electrodes of said tubes to said circuit so as to cause one tube to fire at the beginning of an impulse and the other tube to fire at the end of an impulse, means causing either tube to be extinguished in response to the firing of the other tube, a pair of condensers, means for altering the charge on one of said condensers while one of said tubes is fired during each of a plurality of impulses and for altering the charge on the other of said condensers during the whole of the plurality of impulses, and means controlled by the difference in voltage between said condensers at the end of the plurality of impulses for indicating the impulse ratio of make to break of the source.

4. In a testing apparatus, a circuit including an interrupting device, a pair of gaseous discharge tubes each having an anode, a cathode, and a control electrode, means coupling the control electrodes of said tubes to said circuit in push-pull relation so as to cause the tubes to be fired alternately in response to operation of the interrupting device, means causing either of said tubes to be extinguished in response to the firing of the other tube, a pair of condensers, means for altering the charge on one of said condensers while one of said tubes is fired during each of a plurality of impulses and for altering the charge on the other of said condensers during the whole of the plurality of impulses, and means controlled by the difference in voltage between said condensers at the end of the plurality of impulses for indicating the impulse ratio of make to break of the interrupting device.

5. In a signaling system, an impulse transmitter, a relay, a line connected therebetween, said transmitter operated to transmit impulses, said relay operated intermittently by said impulses, means responsive to the current flow through said relay created by said impulses operative to repeat impulses of the same ratio as those transmitted by said transmitter substantially unaffected by the characteristics of said line, an impulse ratio testing device responsive to the operation of said impulse repeating means and automatic means controlled by said device for returning signals over said line indicating the ratio range of said impulses.

6. In a signaling system, a circuit for passing current, a transmitter operated to alternately make and break said circuit, an inductance connected to said circuit, an impulse repeater the alternate increases and decreases of current in, said inductance effective on each make and break to alter the current supply to said impulse repeater, said repeater operated responsive to such alterations to repeat impulses having a make to break ratio identical to that of the said transmitter and substantially uninfluenced by the characteristics of said circuit, and means responsive to said repeated impulses for testing the ratio of make to break in said circuit and for returning indications of such ratio over said circuit.

7. In a signaling system, an impulse transmitter, a relay, a line connected therebetween, an impulse repeater controlled by a vacuum tube having at least a cathode, an anode, and a control grid, said impulse transmitter operated to transmit impulses to cause said relay to impress on said control grid a counter electromotive force of one polarity on the break period of said impulses and a counter electromotive force of another polarity on the make period, said tube effective to respond to said alternate counter electromotive forces to control said repeater to repeat impulses of the same ratio as those transmitted by said transmitter unaffected by any variations in the characteristics of said line, and an impulse ratio testing device responsive to said repeated impulses.

8. In an impulse ratio testing system, a line, a transmitter connected to said line, an impulse responsive relay also connected to said line and responsive to interruptions therein by said transmitter, a test circuit, means responsive to a preliminary selective operation of said relay by said transmitter for connecting said test circuit to said line, and means in said test circuit responsive to subsequent interruptions in said line by said transmitter to test the ratio of make to break of said interruptions independent of the characteristics of said line and of any further operation of said relay.

9. In a signaling system, an impulse transmitter, a relay, a line connected therebetween, an impulse ratio testing means, an impulse repeater contacts on said relay, means operative under the control of said impulse transmitter for connecting said testing means to said contacts to test the ratio of subsequent transmitter impulses repeated by said contacts or for connecting said repeater to said line and operating the same to repeate impulses having the same ratio of make to break as the subsequent impulses transmitted by said transmitter unaffected by said relay contacts and the characteristics of said line and for causing said testing means to test the ratio of said last repeated impulses.

FRANK KESSLER.

REFERENCES CITED

The following references are of record in the file of this patent:

UNITED STATES PATENTS

| Number | Name | Date |
|---|---|---|
| 1,759,837 | Brown et al. | May 27, 1930 |
| 1,936,947 | Morgenstan | Nov. 28, 1933 |
| 1,964,526 | Melsheimer | June 26, 1934 |
| 2,207,513 | Hadfield | July 9, 1940 |
| 2,245,683 | Kessler | June 17, 1941 |
| 2,307,237 | Rea | Jan. 5, 1943 |

FOREIGN PATENTS

| Number | Country | Date |
|---|---|---|
| 497,147 | Great Britain | Dec. 9, 1938 |